UNITED STATES PATENT OFFICE.

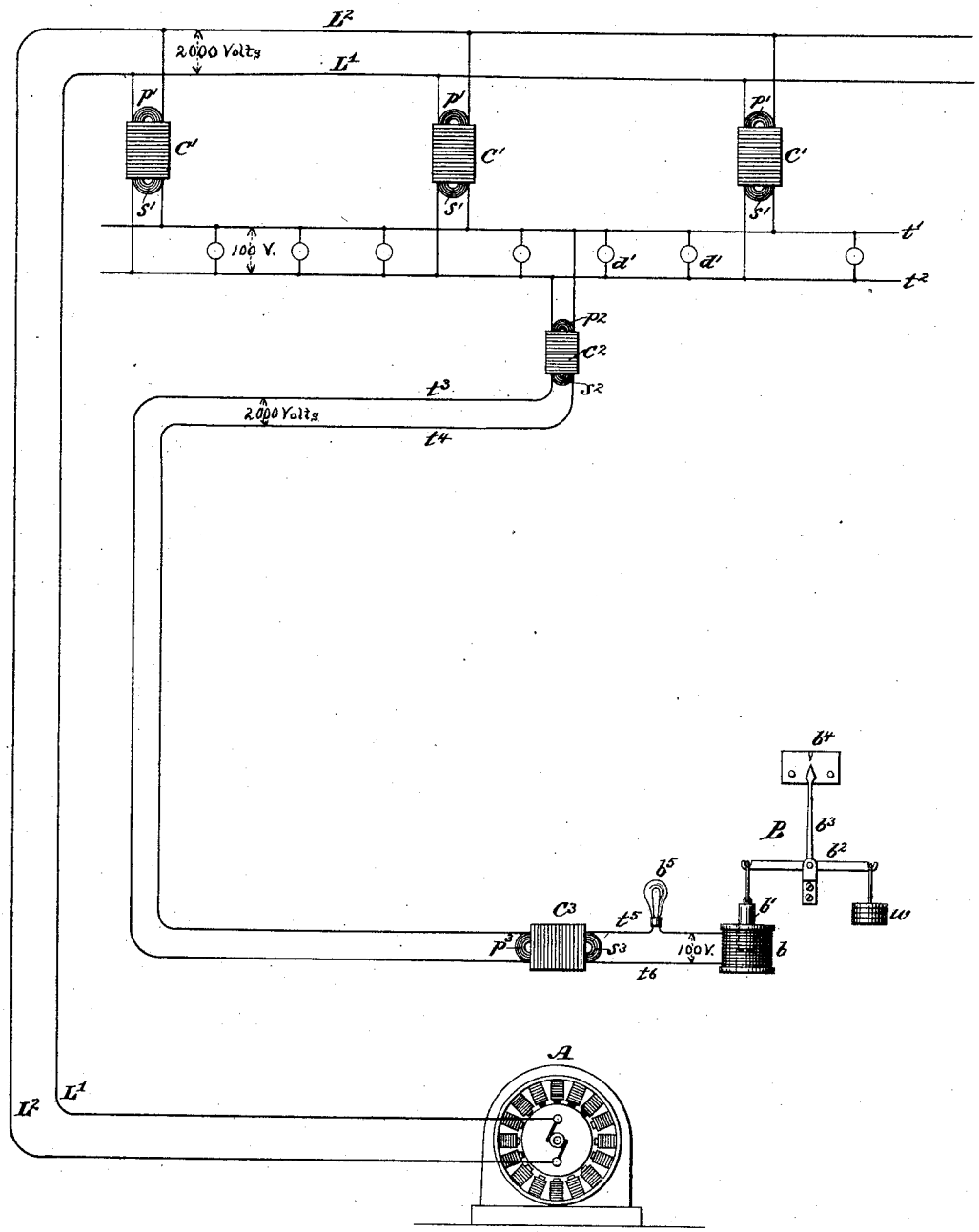

OLIVER B. SHALLENBERGER, OF ROCHESTER, ASSIGNOR TO GEORGE WESTINGHOUSE, JR., OF PITTSBURG, PENNSYLVANIA.

PRESSURE-INDICATING APPARATUS AND CIRCUIT FOR A SYSTEM OF ELECTRIC DISTRIBUTION.

SPECIFICATION forming part of Letters Patent No. 372,936, dated November 8, 1887.

Application filed March 28, 1887. Serial No. 232,666. (No model.)

*To all whom it may concern:*

Be it known that I, OLIVER B. SHALLENBERGER, a citizen of the United States, residing in Rochester, in the county of Beaver and State of Pennsylvania, have invented certain new and useful Improvements in Pressure-Indicating Apparatus and Circuits for a System of Electric Distribution, of which the following is a specification.

The invention relates to an organization of apparatus for determining the electrical pressure or difference of potential upon an electric circuit at any time.

The object of the invention is to provide convenient and economical means for indicating at a central station variations in the electrical pressure at distant points in an electric circuit.

The accompanying drawing is a diagram illustrating a general organization of circuits and apparatus for carrying out the invention.

Referring to the drawing, A represents a suitable source of alternate, intermittent, or pulsatory electric currents, and $L'\ L^2$ conductors leading from the respective poles thereof to more or less distant points. It is designed that these conductors shall convey currents of high potential, and that the potential shall be reduced at or near the points where the currents are to be utilized by means of electric converters $C'\ C'\ C'$. The primary coils $p'$ of these converters are included in the main circuit, while the secondary coils $s'\ s'$ have their terminals connected with a subsidiary or supply circuit, $t'\ t^2$, with which the translating devices $d'\ d'$ are also connected. This represents a general organization of circuits employed in a secondary system of electrical distribution; but it may be variously modified, the purpose being to transmit high potential currents over great distances to points near which they are to be utilized and to reduce the potential at such points by whatever means.

As it is desirable to be able to determine at the central station where the source A is located, or at some other convenient point distant from the translating devices, the difference of potential upon the lines $t'\ t^2$, the indicating device B is employed. This device may be of any well-known character, but preferably consists of a solenoid, $b$, provided with a core, $b'$, preferably of fine wires, suspended from one end of a tilting lever, $b^2$. This core is balanced by a weight, $w$, and the core is drawn a greater or less distance into the solenoid, according to the potential of the currents traversing the latter. An indicator, $b^3$, applied to a plate, $b^4$, serves to show the potential of the currents traversing the solenoid. A carbon resistance, which may with advantage be an incandescent electric lamp, $b^5$, is preferably included in circuit with the solenoid $b$.

As it is desirable to locate the indicator B at a point distant from the translating devices $d'\ d'$, it is desirable that means be provided whereby conductors of small size may be employed for conveying the currents back from the conductors $t'\ t^2$ to the device B. For this purpose a converter, $C^2$, has its primary coil $p^2$ connecting with the conductors $t'\ t^2$, and its secondary coil $s^2$ has its respective terminals connected with conductors $t^3$ and $t^4$, adapted to convey currents of high potential. The converter $C^2$ is organized to increase the potential of the currents received from the conductors $t'\ t^2$, and the currents of high potential thus obtained may readily be transmitted over the small conductors $t^3\ t^4$.

The conductors $t^3$ and $t^4$ are connected at or near the device B through the primary coil $p^3$ of a converter, $C^3$, constructed to reduce the potential. The secondary coil $s^3$ of this converter has its terminals connected with conductors $t^5$ and $t^6$, including the device $b^5$ and the solenoid $b$. In this manner it will be understood that the potential upon conductors $t'\ t^2$ will be indicated upon the device B, and the conductors $t^3\ t^4$, conveying the electrical energy, may be of small cross-section.

For the purpose of conveniently indicating the successive changes in the current upon the circuits, the drawing indicates a difference of potential of two thousand volts as existing upon the circuit $L'\ L^2$, of one hundred volts on the circuit $t'\ t^2$, two thousand volts upon the circuit $t^3\ t^4$, and one hundred volts upon the circuit $t^5\ t^6$. These ratios may, however, be changed, as found desirable.

I claim as my invention—

1. The combination, with a source of electricity and conductors conveying currents therefrom, of converters reducing the potential of the currents, a secondary circuit receiving the currents of reduced potential, translating devices included in said secondary circuit, a converter increasing the potential received from the said second circuit, conductors extending therefrom to a distant point, and an indicator operated by the electrical energy conveyed thereby.

2. The combination, with a system of electrical distribution employing alternating, undulatory, or pulsatory currents, of a pressure-reducing device connected with the translating-circuit, an indicating device located at a point distant therefrom, a pressure-increasing device connected with the translating-circuit, and an electric connection from said pressure-increasing device to said indicating device.

3. The combination, with a system of electrical distribution, of a converter increasing the potential of the currents operating the translating devices, conductors adapted to convey currents of higher potential than the currents upon the translating-circuit, extending from said converter to a central station, a device for reducing the potential, having its primary coils included in the circuit of said conductors, and an indicating device included in the secondary circuit of said device.

In testimony whereof I have hereunto subscribed my name this 21st day of March, A. D. 1887.

OLIVER B. SHALLENBERGER.

Witnesses:
DARWIN S. WOLCOTT,
R. H. WHITTLESEY.